July 3, 1928.
C. C. BENNETT
1,675,481
MOTOR VEHICLE WHEEL GAUGE
Filed Sept. 23, 1926
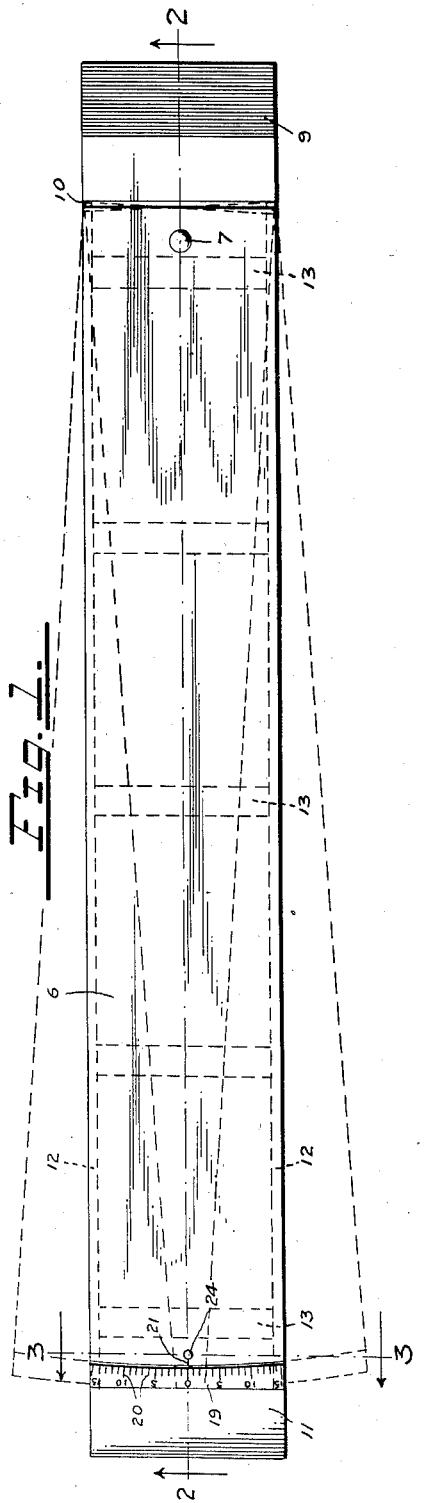
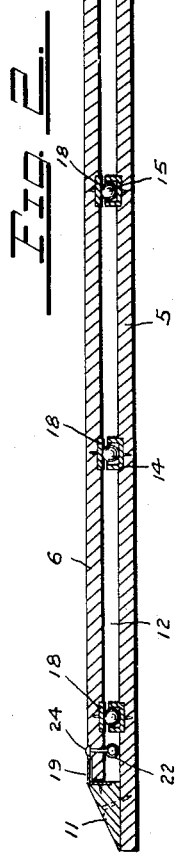
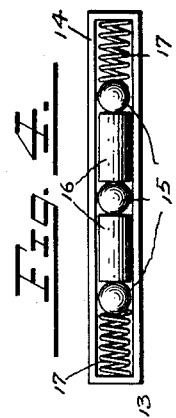
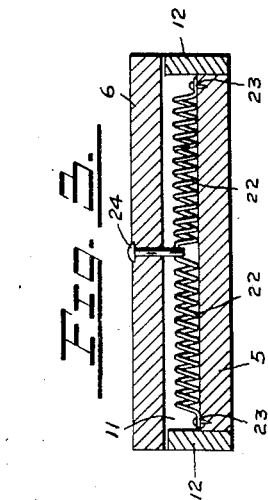
INVENTOR
Claude C. Bennett
BY
Frank Warren
ATTORNEY Patented July 3, 1928.

1,675,481

UNITED STATES PATENT OFFICE.

CLAUDE C. BENNETT, OF SEATTLE, WASHINGTON, ASSIGNOR TO A. E. FERAGEN, INC., OF SEATTLE, WASHINGTON.

MOTOR-VEHICLE-WHEEL GAUGE.

Application filed September 23, 1926. Serial No. 137,227.

My invention relates to improvements in motor vehicle wheel gauges and the object of my invention is to provide a motor vehicle wheel gauge that will indicate whether or not the front wheel of a motor vehicle is set to the proper pitch or toe in when the wheel is caused to travel over the gauge thus making it possible to determine when the wheel is out of alignment and substantially the amount that said wheel is out of alignment by driving slowly over the gauge with the wheel that is being tested.

Another object is to provide a gauge embodying a base or support with a runner board pivotally mounted thereon in such a manner that the movement of a wheel lengthwise over the runner board will produce a sidewise or swinging movement of the runner board about its pivot if the wheel is not adjusted to toe in properly, the amount of which sidewise movement will be proportional to the amount that the wheel is out of adjustment.

A further object is to provide a gauge of this nature having a scale or indicator means to indicate the amount that the wheel is out of line.

Other objects are to provide anti-friction mountings for the runner board and means for yieldingly urging the runner board into a central position when it is not in use.

In the setting or adjusting of the front wheels of a motor vehicle said front wheels are ordinarily set so that they are closer together at the bottom than they are at the top. This is a permanent adjustment usually made at the factory and has no connection with my present invention. In addition to the camber the front wheels should also be set so that they are closer together at the front than they are at the back. It is this latter adjustment for which my gauge is intended. This latter adjustment commonly called an adjustment for toe-in or pitch is ordinarily made so that the distance between the centers of the tires in front of the wheel in a horizontal plane that bisects the axes is from one-fourth to three-eighths of an inch less than the distance between corresponding points at the rear of the wheel. This adjustment for toe-in or pitch is usually made by adjusting the effective length of the steering knuckle tie rod and the wheels are checked for this adjustment by measuring the distances between corresponding points on the tire at the front and rear of the wheel. My gauge eliminates the necessity of making these measurements and shows accurately and almost instantly whether or not the wheel is out of adjustment and how much it is out.

With the above and other objects in view which will appear as the description proceeds the invention consists of the novel construction, adaptation, combination and arrangement of parts hereinafter described and claimed. These objects are accomplished by devices illustrated in the accompanying drawings, wherein:—

Figure 1 is a top plan view of a vehicle wheel gauge embodying the features of the invention.

Fig. 2 is a view in longitudinal vertical section taken substantially on a broken line 2, 2 of Fig. 1.

Fig. 3 is an enlarged view in transverse vertical section taken on a broken line 3, 3 of Fig. 1.

Fig. 4 is an enlarged top plan view of one of the anti-friction devices.

Referring to the drawings throughout which like reference numerals designate like parts, the numeral 5 indicates a base and the numeral 6 indicates the runner board. Said runner board is pivotally secured to the forward end portion of said base by a bolt 7 passing through same and through a transverse strip 8 interposed between said boards and secured to said board.

A beveled member 9 is secured to the forward end portion of the base board 5 having its beveled edge flush with the end thereof and its rear edge in slight spaced relation with the forward end of the runner board 6, as at 10, so that said runner board may turn freely on its pivot 7 through a small angle for reasons more fully hereinafter set forth.

A beveled member 11 is secured to the rear end portion of the base board 5 having its beveled edge flush with the end thereof and its forward edge in slight spaced relation with the rear end of the runner board 6. Side members 12 are secured to said base board for the purpose of preventing the entry of dust and dirt between the base and runner boards.

A plurality of anti-friction devices designated as a whole by the numeral 13, are interposed in spaced relation between the base board 5 and runner board 6. Referring to Fig. 4 said devices comprise a casing 14 with a plurality of balls 15 therein having stud spacer members 16 between said balls and spring members 17 between the balls and the ends of said casing.

The anti-friction devices 13 are placed in spaced relation between the runner and base boards and their casings 14 are secured to said base board. The balls 15 project slightly above said casings and engage metal plates 18 that are secured to the underside of said runner board. It will thus be seen that said balls retain the runner and base boards in parallel spaced relation and permit said runner board to pivotally move on its axis 7.

A metal flanged plate 19 is secured to the beveled member 11 and projects over the rear end of the runner board 6 without touching same. Said plate is provided with graduations 20 and an index mark 21, centrally placed on the rear end of said runner board, is adapted to register with the central zero graduation on said plate when the runner board is in its normally central position.

Referring to Fig. 3 of the drawings, the runner board 6 is held in its normally central position by opposing helical springs 22 whose outer ends are secured to the base board 5 at 23 and whose inner ends are secured to a pin 24 passing centrally through the rear end of said runner board.

In using my gauge the forward wheel on one side of a vehicle is run up over the beveled member 9 and along the center of the runner board 6 to its rear end portion. If the wheel is true and properly set with correct pitch said runner board will remain stationary and its index mark 21 will continue to register with the central zero graduation on the plate 19.

On the other hand, if the wheel is faulty in its setting or if the tire has become worn on either side it will cause the runner board 6 to pivotally move on its axis or bolt 7 to the opposite side on which the tire is worn as shown by dotted lines in Fig. 1, and the amount of such movement may be read from the graduations 20 as will be readily understood. It will now be apparent that I have provided an effective means for determining the error in the setting of vehicle wheels whereby the proper adjustment may be readily made.

Having thus described my invention, it being understood that minor changes may be made without departing from its scope and spirit, what I claim and desire to secure by Letters Patent of the United States is:

A vehicle wheel gauge comprising an elongated base, a runner board pivotally mounted at one end of said base, resilient means for normally retaining said runner board in a predetermined position with respect to said base, and anti-friction means disposed between said base and runner board, said anti-friction means comprising a casing, a plurality of balls in said casing, spacers disposed between said balls, and springs disposed between the ends of said casing and the adjacent ball.

In witness whereof, I hereunto subscribe my name this 13th day of Sept. A. D. 1926.

CLAUDE C. BENNETT.